US006942842B2

(12) United States Patent
Breuer et al.

(10) Patent No.: US 6,942,842 B2
(45) Date of Patent: Sep. 13, 2005

(54) PROCESS FOR THE DESULFURIZATION OF CO GAS

(75) Inventors: Werner Breuer, Krefeld (DE); Karl-Heinz Köhler, Viersen (DE)

(73) Assignee: Bayer Aktiengesellschaft, Leverkusen (DE)

(*) Notice: Subject to any disclaimer, the term of this patent is extended or adjusted under 35 U.S.C. 154(b) by 3 days.

(21) Appl. No.: 10/755,568

(22) Filed: Jan. 12, 2004

(65) Prior Publication Data

US 2004/0141901 A1 Jul. 22, 2004

(30) Foreign Application Priority Data

Jan. 16, 2003 (DE) .......................... 103 01 434

(51) Int. Cl.[7] .................. B01D 53/48; C01B 31/18
(52) U.S. Cl. ................ 423/244.01; 423/244.03; 423/244.06; 423/418.2
(58) Field of Search .............. 423/231, 418.2, 423/563–64, 244.03, 244.06, 244.1

(56) References Cited

U.S. PATENT DOCUMENTS

| | | | | |
|---|---|---|---|---|
| 1,330,772 A | * | 2/1920 | Bosch et al. | 423/656 |
| 1,695,130 A | * | 12/1928 | Wietzel | 423/418.2 |
| 4,981,661 A | | 1/1991 | Borsboom et al. | 423/244 |
| 5,763,350 A | | 6/1998 | Immel et al. | 502/307 |
| 5,859,070 A | * | 1/1999 | Jackson et al. | 518/713 |
| 5,985,227 A | | 11/1999 | Immel et al. | 423/242.1 |
| 6,126,911 A | | 10/2000 | Scranton, Jr. | 423/230 |
| 6,726,852 B2 | * | 4/2004 | Iijima et al. | 252/373 |
| 2002/0024038 A1 | | 2/2002 | Iijima et al. | 252/373 |
| 2002/0059864 A1 | | 5/2002 | Janssen et al. | 95/108 |

FOREIGN PATENT DOCUMENTS

| | | |
|---|---|---|
| DE | 2006758 | 8/1971 |
| DE | 28 45 725 | 3/1980 |
| DE | 1572 62 | 10/1982 |
| DE | 43 21 542 | 9/1994 |
| DE | 195 48 010 | 5/1996 |
| EP | 0 234 433 | 9/1987 |
| GB | 2 248 444 | 4/1992 |
| JP | 61-268792 | * 11/1986 |
| JP | 58-45720 | * 3/1993 |
| WO | 93/13184 | 7/1993 |

OTHER PUBLICATIONS

Full English translation of JP 61–268792, published Nov. 1986.*
Full English translation of DE 1572 62, published Oct. 1982.*
Full English translation of EP 0 234 433, published Sep. 1987.*
Full English translation of DE 43 21 542, published Sep. 1994.*
Ful English translation of JP 58–45720, published Mar. 1983.*
Derwent abstract accession No. 1983–22701K, for DD 157262, published Oct. 27, 1982.*
Derwent abstract accession No. 1994–265061, for DE 4321542, published Sep. 1, 1994.*

* cited by examiner

Primary Examiner—Stanley S. Silverman
Assistant Examiner—Ardith E. Hertzog
(74) Attorney, Agent, or Firm—Joseph C. Gil; John E. Mrozinski, Jr.

(57) ABSTRACT

The present invention provides a process for the preparation of carbon monoxide gas (CO gas) that is free of sulfur compounds to the greatest possible extent and a process to use that gas in chemical syntheses, for example, for the synthesis of phosgene from carbon monoxide and chlorine.

6 Claims, No Drawings

PROCESS FOR THE DESULFURIZATION OF CO GAS

FIELD OF THE INVENTION

The present invention relates to a process for the preparation of carbon monoxide gas (CO gas) that is substantially free of sulfur compounds, to a process for the desulfurization of a CO gas containing sulfur, and to the use of that gas in chemical syntheses, for example, for the synthesis of phosgene from carbon monoxide and chlorine.

BACKGROUND OF THE INVENTION

The availability of CO gas that is as pure as possible is highly desirable for many chemical syntheses. CO gases are often contaminated with impurities, for example sulfur compounds, which act as catalytic poisons or secondary-reaction initiators or which lead in other ways to interruptions in operation or even to the total loss of production.

Many attempts have therefore been made to obtain pure forms of preparation of that gas.

For example, the method of converting organic sulfur compounds in the presence of steam on an aluminum oxide contact at temperatures of about 160° C. to form hydrogen sulfide and carbon dioxide is described on p. 3, line 6 ff of DE-A 43 21 542, although detailed information regarding the degree of conversion of the organic sulfur compounds is not given.

DE-A 41 04 202 describes on p. 3, line 14 ff, the almost quantitative hydrolysis of carbon oxide sulfide at markedly lower temperatures of from 20 to 150° C. on aluminum oxide contacts which, however, have been doped with further very expensive transition metals. Column 2, line 9 ff and column 7, line 20 ff of EP-A 0 324 526 describe the use of a titanium dioxide contact for the hydrolysis of COS and $CS_2$ at temperatures above 300° C. with a lower degree of conversion of from 90 to 96% (based on organic sulfur compounds). However, those processes use contacts which are expensive and complex to prepare using doped aluminum oxides or titanium dioxide.

In GB-A 22 48 444, there is described the use of an aluminum oxide contact for the conversion of hydrogen sulfide with carbon dioxide at from 60 to 120° C. to carbon oxide sulfide and water as a reverse reaction; the resulting carbon oxide sulfide is subsequently decomposed thermally. EP-A 0 234 433 describes the use of an aluminum oxide contact doped with alkali for the absorption (not the conversion) of acidic gases, inter alia hydrogen sulfide. However, these processes have the disadvantage that the $Al_2O_3$ contacts used either have to be pretreated in a complex and expensive manner or effect too low a degree of conversion or require the use of too great an amount of energy.

The process of the chemical absorption of hydrogen sulfide on iron-hydroxide-containing materials with the concomitant use of oxygen has already been mentioned in DE-A 20 06 758; the optimization of the absorption materials in respect of the content of iron hydroxide and loosening agent is described therein on p. 2. DE-A 28 45 725 claims the preparation of iron-hydroxide-containing absorption materials based substantially on iron (II) sulfate and calcium oxide and their use in the chemical binding of hydrogen sulfide. DD-A 15 72 62 mentions on p. 3 the use of limonite as an iron-hydroxide-containing material for the removal of hydrogen sulfide from CO-containing gases.

U.S. Pat. No. 6,126,911 describes the use of iron oxides (claim 3) or iron oxide hydrates (column 5, line 18) in combination with moistening agents such as glycols etc. for the absorption of hydrogen sulfide from dry gases, with only 67% of the hydrogen sulfide contained in the gas stream being retained in the most advantageous case (column 7, line 55). WO-A 93/13184 describes the absorption of hydrogen sulfide from dry gases on iron oxides onto $SiO_2$-containing carrier materials in the presence of oxygen at considerably higher temperatures of about 200° C. (p. 22, line 20 ff to p. 23, line 22). The hydrogen sulfide is thereby retained on the contact in the form of elemental sulfur with an efficiency of only 80%. After catalytic hydrogenation of the gas mixture for the complete conversion of sulfur compounds into hydrogen sulfide, the residual amounts of sulfur are adsorbed on activated carbon doped with iron oxide. Column 6, lines 16–40 of EP-A 1180544 describes the use of tri-iron tetra-oxide at 400° C. for the absorption of hydrogen sulfide on the contact in the form of iron sulfide; in a subsequent step, residual amounts of hydrogen sulfide are bonded to zinc oxide in the form of zinc sulfide. The examples of EP-A 722 774 describe the use of iron(III) oxide in combination with molybdenum oxide on an aluminium oxide carrier at least 350° C. for the absorption of hydrogen sulfide in the form of sulfide on the contact. However, all those processes either use undesirable auxiliary substances (glycol) or require the use of far too much energy, or technically complicated subsequent steps (deposition of sulfur), to achieve usable results.

The process of the physical adsorption of gases on activated carbon is generally known in the art. For the adsorption of hydrogen sulfide from CO gas, DE-A 4321542 claims an activated carbon that has been doped with iodine or iron compounds and permits a residual content of hydrogen sulfide in the CO gas of less than 10 mg/m$^3$. WO-A 93/13184 describes (p. 23, line 12 ff) the use of an iron-oxide-containing activated carbon on which hydrogen sulfide is oxidized to elemental sulfur in the presence of oxygen at 50° C. and adsorbed to a residual content of 2 vol.ppm hydrogen sulfide in the CO gas. However, pretreatment of the activated carbon is necessary in those processes, and in some cases excessively high absorption temperatures.

SUMMARY OF THE INVENTION

Accordingly, the present invention provides an inexpensive and reliable process with which gaseous sulfur-containing compounds in the form of secondary constituents in the CO gas can be removed as quantitatively as possible, continuously and in justifiably short reaction times, without exhibiting the disadvantages known in the art. The desulfurized CO gas can be used as a material for those chemical syntheses in which undesirable secondary reactions would be initiated by the presence of sulfur compounds.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages and so forth in the specification are to be understood as being modified in all instances by the term "about."

It has now been found, surprisingly, that such a process can be achieved by the combination of appropriate steps. In the process of the present invention, the crude CO gas, which contains inorganic and organic sulfur compounds that are gaseous under the process conditions, is subjected in the first step to a so-called conversion stage in which the crude CO gas is continuously charged with steam and fed at elevated temperature to an aluminum oxide contact. Organic sulfur compounds are thereby converted to the greatest possible extent into carbon dioxide and hydrogen sulfide. A high degree of conversion can be achieved by adhering, to defined process conditions.

In a subsequent chemical absorption stage, the CO gas, which contains predominantly hydrogen sulfide as the sulfur component, is passed continuously over reaction towers in which there is located an iron-hydroxide-containing, granular and porous material, to which hydrogen sulfide is bonded in the form of iron sulfide and elemental sulfur in the presence of defined amounts of oxygen and water. The oxygen and sulfur contents in this absorption stage can be monitored continuously at various points, either to adapt the amount of oxygen that is metered in or to change over between absorption towers in the installation before the sulfur content in the emergent CO gas becomes impermissibly high. This changeover means that an absorption tower of relatively high absorption capacity, through which the gas flows later in the series and which is therefore less laden with sulfur, is connected so that it is the first absorption tower in the series of absorption towers through which the incoming CO gas flows. The fully laden absorption tower is taken out of operation and the exhausted, fully laden biogas material is fed to further processing. When equipping the tower with biogas material again, either a freshly equipped tower can be connected as a replacement into the series as the last tower in the absorption stage, or the tower that has been taken out of operation is itself connected into the series again, after being re-equipped, as the last tower in the absorption stage.

In a third step, the CO gas so purified is passed in the so-called adsorption stage over activated carbon towers, whereby residues of organic and inorganic sulfur compounds are adsorbed almost quantitatively on the activated carbon in the presence of defined amounts of ammonia. The oxygen and sulfur contents in this adsorption stage are likewise monitored continuously at various points, either to adapt the amount of oxygen that is metered in or to change over between activated carbon towers in the installation before the sulfur content in the emergent CO gas becomes impermissibly high. This changeover means that an activated carbon tower of relatively high adsorption capacity, through which the gas flows later in the series and which is therefore less laden with sulfur, is connected so that it is the first activated carbon tower in the series of activated carbon towers through which the incoming CO gas flows; the fully laden activated carbon tower is taken out of operation and regenerated. During the regeneration of the tower, either an already regenerated tower can be connected as a replacement into the series as the last tower in the adsorption stage, or the tower that has been taken out of operation is itself connected into the series again, after being regenerated, as the last tower in the adsorption stage.

The individual process steps can all be monitored and controlled by on-line analysis to ensure optimal process conditions.

The desulfurized CO gas leaving the activated carbon has a residual content of inorganic and organic sulfur compounds of in each case less than 5 mg/Nm$^3$, preferably less than 2 mg/Nm$^3$ The CO gas prepared in accordance with the process of the present invention is largely free of further impurities, such as hydrogen, oxygen, carbon dioxide, methane and water. It may preferably be used for chemical syntheses in which all the aforementioned impurities would be troublesome, especially for example, for phosgene synthesis.

The desulfurization process for CO gas according to the present invention is a combination of three continuously operated process steps which, by their combination and their form, surprisingly permit particularly high efficiency of the CO gas desulfurization from the economic point of view and lead to a particular purity of the CO gas.

The present invention accordingly relates to a process for the desulfurization of a CO gas containing as secondary constituents sulfur compounds that are gaseous under the process conditions. Such a CO gas can originate, for example, from a so-called partial oxidation installation in which carbon-rich fuels, for example hard coal coke, pitch coke, oil coke, graphite or anode residues from aluminum production, are converted to the carbon monoxide stage in the presence of pure oxygen and pure carbon dioxide using the Boudouard equilibrium. Preference is given to the use of anode residues and coke types having a sulfur content of less than 2.5 wt. %, more preferably less than 1.5 wt. %, most preferably less than 1.0 wt. %, and an ash content of less than 10 wt. %, more preferably less than 3 wt. % and most preferably less than 1 wt. %. Under these reducing reaction conditions, virtually no sulfur oxides but predominantly sulfur compounds such as, for example, carbon oxide sulfide, carbon disulfide, mercaptans and hydrogen sulfide are formed from the sulfur compounds contained in the fuels. The desulfurization process according to the present invention is particularly suitable for removing such compounds from the CO gas.

The inventive process is distinguished by high economy, efficiency and availability, which is determined by the following factors:

1.) use of simple reaction contacts or auxiliary substances which are commercially available and are not subjected to additional treatment;
2.) continuous process, which is simple in terms of apparatus, on fixed-bed reactors with a high degree of variability of the installation, in which reactors can be connected in parallel or in series, if required, thus providing reserves in the case of failure of individual reactors;
3.) no expensive regenerating circuits (apart from the activated carbon stage), but optimum use of reaction contacts with subsequent processing;
4.) energy recirculation in the conversion stage;
5.) high degree of variability in the gas throughputs throughout the installation.

The analytical monitoring, which takes place on-line, of the reaction processes in the process according to the invention permits the optimum use of installation capacities and accordingly also high degrees of conversion in the individual process stages.

Individual process steps, preferably the entire process, are carried out at pressures above normal pressure.

The process according to the present invention is highly suitable especially for small and medium-sized production installations having CO gas throughputs of from 1000 to 15,000 Nm$^3$/h CO gas with a sulfur content of up to 6000 mg/Nm$^3$, preferably for installations having CO throughputs of from 1000 to 10,000 Nm$^3$/h and sulfur contents of from 1000 to 5000 mg/Nm$^3$ and most preferably for installations having CO throughputs of from 3000 to 8000 Nm$^3$/h and sulfur contents of from 2000 to 5000 mg/Nm$^3$.

1 Nm³ herein means "standard cubic meters", i.e. an amount which corresponds to 1 m³ at 20° C. and 1.01325 bar.

The CO gas laden with sulfur compounds that is used in the process according to the present invention should be largely free of dust before it is fed to the first stage of the sulfur conversion. Dust removal can be carried out either by a wet process or by dry dust removal. The dust-free CO gas containing the sulfur compounds is preferably heated in steam heat exchangers to a temperature of at least 280° C., more preferably to a temperature of 300° C., which is kept constant within a narrow range of ±5° C. Before entering the conversion towers, the CO gas is charged with steam in a sufficient amount, which is dependent on the content of sulfur compounds and on the moisture content of the incoming gas. The amount of steam should be so chosen that the water content in the CO gas is at least 2.5 wt. %, more preferably 3.0 wt. %, based on CO gas.

The hot CO gas charged with steam is fed at elevated pressure, which is from 1.5 to 10 bar, more preferably from 1.5 to 5 bar, to so-called conversion towers. These are conventional fixed-bed reactors having a sieve base, which contain an uninterrupted, compact filling of aluminum oxide contact ($Al_2O_3$) in the form of solid grains and through which the gas flows from top to bottom. Two or more conversion towers can be connected in series or in parallel; in the case of the sulfur contents mentioned above, a single pass through a conversion tower is usually sufficient.

It is possible to use any type of sintered aluminum oxide that is suitable as contact or carrier material and possesses adequate mechanical strength. The bulk height and the particle size of the aluminum oxide contact should be so chosen that the pressure loss in the fixed-bed reactor is less than 0.2 bar. There are suitable cylindrical granules having a length of 10 mm and a diameter of 4 mm in a bulk height of less than 8 m. The specific surface area of the aluminum oxide contact should be at least 200 m²/g, more preferably 230 m²/g; the pore volume should be at least 0.5 ml/g, more preferably 0.7 ml/g.

Organic sulfur compounds, especially carbon oxide sulfide and carbon disulfide, are hydrolyzed on that aluminum oxide contact with water to form hydrogen sulfide and carbon dioxide (See Equations 1. and 2.):

$$CS_2 + 2H_2O \rightarrow 2H_2S + CO_2 \qquad \text{Eq. 1:}$$

$$COS + H_2O \rightarrow CO_2 + H_2S \qquad \text{Eq. 2:}$$

Under the reaction conditions according to the present invention, the capacity of such conversion towers is used optimally, so that the average dwell time of the CO gas in such a conversion tower is less than 2 minutes, more preferably less than 1.5 minutes. A rate of conversion of the organic sulfur compounds of more than 95%, in most cases even of more than 98%, based on the initial amount used, is achieved. The conversion in such conversion towers is monitored by on-line analysis of the incoming and emergent CO gas stream.

To optimize the energy balance in the conversion stage, a heat exchange takes place between incoming and outgoing CO gas in a countercurrent heat exchanger.

After cooling to a temperature of below 50° C. but above 20° C., more preferably to 30° C., the CO gas so converted is fed to the chemical absorption stage. Before entering the absorption towers, an amount of at least 4000 mg/Nm³, optionally more than 7000 mg/Nm³, of pure oxygen is mixed with the CO gas, according to the amount of hydrogen sulfide it contains. The amount of oxygen added prior to the absorption stage is limited by the maximum permissible oxygen concentration of 0.15 vol. % at the entry to the activated carbon adsorption stage (see above). The CO gas should be saturated with steam but contain at least 10,000 ppm water; steam is optionally added to the CO gas. The absorption towers are filled with an iron-hydroxide-containing, porous material, on which the conversion of hydrogen sulfide to iron sulfide and to elemental sulfur takes place in the presence of sufficient amounts of water and oxygen. In the oxidation of iron sulfide to elemental sulfur, the active form of the iron hydroxide is formed again in the presence of water and hence the capacity of the contact, based on its useful life, is increased. The chemical reactions in the loading and in the regeneration of the absorption material are shown in Equations 3 and 4:

$$2\,Fe\,O(OH) + 3H_2S \rightarrow Fe_2S_3 + H_2O \text{ [loading reaction]} \qquad \text{Eq. 3:}$$

$$2\,Fe_2S_3 + 3O_2 + 2H_2O \rightarrow 4\,Fe\,O(OH) + \tfrac{6}{8}\,S_8 \text{[regeneration reaction]} \qquad \text{Eq. 4:}$$

Suitable starting materials for the iron-hydroxide-containing materials are various products occurring on an industrial scale, such as, for example, the lye residues from the working up of bauxite, or the so-called Béchamp residues from the reduction of organic nitro compounds with iron turnings, or so-called limonite, or synthetic materials such as are formed when iron (II) sulfate is reacted with calcium hydroxide with subsequent oxidation in the air (see DE-A 28 45 725). To provide an adequate absorption capacity, an iron hydroxide content of at least 15 wt. % (calculated as Fe), preferably greater than 20 wt. %, based on the materials, is required. The materials used in the absorption towers, which are also known as biogas materials, contain substances such as, for example, cement, lime or gypsum as binders for increasing the mechanical strength. For increasing the capacity of such materials there are used loosening agents, which increase the diffusion of the gas into the material, so that not only the surface of the granular, porous materials but also the layers located more deeply take part in the chemical absorption. An example of a suitable loosening agent is sawdust (see DE-A 28 45 725, DE-A 20 06 758); care must be taken to ensure that such loosening agents do not contain acids, which may react with the binders in the materials.

When operating the absorption towers with such so-called biogas materials, it is important that the pressure loss of the CO gas in the absorption zone does not become impermissibly high, i.e. does not exceed a pressure difference of 0.5 bar, preferably 0.4 bar, even with the series connection of absorption towers. That is achieved substantially by suitably selecting the biogas material and by measures relating to the apparatus.

Suitable biogas materials are distinguished by the fact that they ensure sufficiently high permeability of the granular material even in the laden state, taking into account the elemental sulfur that is deposited, which can lead in places to considerable solidification of the biogas material laden with sulfur. Sufficient permeability of the biogas material, even in the laden state, is achieved by optimum particle size distribution, the particle size being not more than 10 mm and not less than 3 mm and the proportion of particle sizes between 5 mm and 8 mm being at least 45 wt. %.

Suitable apparatuses are, for example, absorption towers in which the biogas materials are accommodated in a plurality of mesh baskets each of limited but equal bulk height. Such mesh baskets are in principle so constructed that the CO gas to be desulfurized is able to flow freely over the surface of the biogas material, and the biogas material is separated mechanically from the side on which the desulfurized CO gas is discharged by means of a sufficiently fine-meshed grid, so that it is not possible for larger amounts of biogas material particles to be carried away together with the gas stream. Fine-grained, inert solids (e.g. fine-grained crushed coke) can optionally be used as a filter layer between the biogas material and the grid construction. The intake and discharge sides are separated from one another by solid walls. Furthermore, the mesh baskets are separated from one another by means of bases or cover plates, so that each mesh basket forms its own separate gas chamber, but all the mesh baskets are preferably coupled to common supply and discharge pipes. In mesh baskets that are preferably used, the CO gas to be desulfurized flows in from above, so that the CO gas flows through a loose filling of biogas material that is from 120 to 180 cm high, preferably about 150 cm high, and exits through a horizontally arranged grid plate located in the base region of the basket. Between the grid plate and the base plate of the basket, the emergent CO gas is diverted to a centrally arranged discharge pipe, via which it leaves the absorption tower. The mesh baskets that are preferably used can be stacked one above the other in the absorption tower so that the CO gas can enter the baskets from the side through defined spaces along the outside walls of the baskets and can flow into the biogas material from above. In the middle of each basket there is a vertically arranged tube segment which contains inlet openings between the grid plate and the base plate, so that a central discharge pipe for the CO gas is formed when all the baskets are in the stacked state. At the bottom and top of the absorption tower, the discharge pipe is sealed with respect to the other gas chamber (CO gas to be desulfurized) of the absorption tower.

Because the reactions taking place on the biogas material are slightly exothermic, it may under certain circumstances be advantageous to cool the CO gas down again between the absorber towers in a heat exchanger.

The CO gas to be desulfurized can flow through the absorption towers either in series or in parallel, depending on the operational conditions, such as throughput and sulfur content. The reduction in the absorptive capacity of an absorption tower can be monitored by on-line analytical measurements of the sulfur content in the incoming CO gas stream and in the emergent CO gas stream, so that such an apparatus can be taken out of operation in good time in a targeted manner to avoid inadmissibly high sulfur contents in the emergent CO gas. When the installation is operating in the optimum manner, the CO gas leaves the chemical absorption stage with a content of organic and inorganic sulfur compounds in the range of in each case approximately from 50 to 100 mg/Nm³ CO gas. This corresponds to a rate of absorption of more than 98%, based on the ingoing amount of inorganic sulfur compounds.

The CO gas so desulfurized is then passed to the activated carbon adsorption stage. The temperature in the heat exchanger is so adjusted that the temperature of the CO gas on entering this stage is below 50° C., more preferably not more than 35° C. Before the CO gas enters the activated carbon adsorption towers, an amount of at least 150 mg/Nm³ but not more than 310 mg/Nm³ of gaseous ammonia is mixed homogeneously with the CO gas. The oxygen content in the CO gas, which is present as an excess from the oxidation reaction in the preceding chemical absorption stage, should be not more than 0.15 vol. %.

A plurality of activated carbon adsorption towers are present and the CO gas can flow through them either in series or in parallel, depending on the operational requirements. The activated carbon towers are fixed-bed reactors and are in the form of cylindrical apparatuses having a sieve base; they contain an uninterrupted packing of granular activated carbon, through which the gas flows from top to bottom. Suitable granular activated carbons have sufficient strength to avoid impermissibly large amounts of fine abraded material, which can be formed especially in regeneration procedures. The particle size distribution should be so chosen that the pressure loss of the CO gas in the adsorption stage as a whole is not more than 0.4 bar. Suitable activated carbons have a specific surface area of from 1000 to 1200 m²/g and a pore volume, at pore sizes of less than 20 nm, of from 0.5 to 0.7 ml/g, e.g. the activated carbon "D 47-4" from VFT.

The residual sulfur compounds, e.g. unconverted organic sulfur compounds, elemental sulfur and hydrogen sulfide, are retained on the activated carbon. In the presence of ammonia and traces of oxygen there is formed inter alia ammonium sulfate, which can be removed from the activated carbon during the regeneration with steam. The chemical reactions are shown in Equations 5 and 6:

$$NH_3 + H_2S \rightarrow NH_4SH \qquad \text{Eq. 5:}$$

$$NH_4SH + 2O_2 \rightarrow (NH_4)_2SO_4 \qquad \text{Eq. 6:}$$

The oxygen, ammonia and sulfur contents are monitored continuously at various points in the adsorption stage to correct the amounts of material metered in, where appropriate, or to change over between activated carbon towers in the installation in good time, before the sulfur content in the emergent CO gas can exceed the permissible value.

If an activated carbon adsorption tower has reached the limit of loading with sulfur, it is disconnected from the other towers and regenerated separately. Regeneration of the activated carbon adsorption towers is carried out in two steps. For that purpose, apparatuses from different process stages can be connected together. In the first step, about 1000 Nm³/h of desulfurized CO gas, which is removed at the end of the preparation process and heated in a heat exchanger to at least 280° C., preferably 300° C., flow through the laden activated carbon from top to bottom. The emergent CO gas is fed back to the CO stream entering the sulfur conversion step upstream of the countercurrent heat exchanger. This "flushing process" is continued until the sulfur content in the emergent CO gas is below 100 mg/Nm³. In the second step, steam, preferably steam at 5 bar, is passed through the activated carbon tower from top to bottom, the sulfur-containing condensed steam being discharged at the base of the tower.

When the activated carbon adsorption stage is operating in the optimum manner in accordance with the specifications, the CO gas leaves the installation with a content of organic and inorganic sulfur compounds of in each case less than 5 mg/Nm³, more preferably less than 2 mg/Nm³. This corresponds to a rate of adsorption of the sulfur compounds of more than 95%.

The CO gas so purified is brought to a pressure of 3.5 bar, and water is removed therefrom to a residual content of less than 10 ppm in a subsequent conventional drying stage in accordance with the known art by preliminary condensation in a brine heat exchanger at a temperature of 3° C. and by subsequent drying in towers filled with silica gel.

The pure CO gas leaving this desulfurization installation contains in each case less than 5 mg/Nm³, more preferably less than 2 mg/Nm³, of organic and inorganic sulfur compounds, less than 1.5 vol. % hydrogen, less than 0.15 vol. % oxygen, less than 50 ppm methane and less than 10 ppm water.

The individual stages are preferably present at least in duplicate in terms of apparatus, CO gas flowing through the apparatuses in parallel or in series, as required, and it being possible for individual apparatuses of different process stages to be connected together in a targeted manner if required. As a result, for example, the entire process can be carried out continuously, because the apparatuses can be operated and regenerated in turn.

The process sequence as a whole is subjected to continuous analytical monitoring at various points in the entire process, so that any violations of limiting values in respect of substance concentrations in the CO gas can be recognized sufficiently rapidly and acted upon. In the process according to the invention, the following substances in the CO gas are monitored continuously by so-called on-line analytical methods:

organic sulfur compounds (calibration of the equipment having been carried out with the following chemical compounds: carbon disulfide, carbon oxide sulfide, methylmercaptan, ethylmercaptan)

inorganic sulfur compounds (hydrogen sulfide, sulfur dioxide)

oxygen ammonia (in addition: residual water content and purity)

The inorganic and organic sulfur compounds are determined, for example, by means of on-line gas chromatographs from Siemens, using devices of the type:

SICROMAT RGC 202 R 219 where the sulfur contents in the CO gas are high, and using SICROMAT RGC 202 R 220 where the sulfur content in the CO gas is low. The measured values in each case relate to the sulfur content of the chemical compounds and mean mg [S]/Nm$^3$ CO gas.

Ammonia in the CO gas is determined photometrically using the BINOS device from Endress und Hauser. Oxygen in the CO gas is determined by a paramagnetic measuring process using the OXIMAT device from Siemens.

In the case of the sulfur determinations, sampling points are provided in the inlet stream and in the outlet stream of the CO gas in the sections of the process that are to be monitored, to allow the efficiency of a part of the process to be assessed. Because individual towers of the installation are periodically taken out of operation due to their capacity being exhausted and requiring regeneration, the sampling points are moved accordingly; the conversion towers constitute an exception, because regular regeneration thereof is not required.

The analytical data are recorded and registered in evaluatable form. If given limiting values are exceeded, alarms are sounded and in critical cases, as in the case of oxygen and ammonia, these are associated with the shutting down of the installation for safety reasons.

The Examples which follow are intended to illustrate the process according to the invention, but without limiting it.

EXAMPLES

Example 1

A CO gas from a crude CO gas producing source, containing less than 1.5 vol. % hydrogen, less than 0.15 vol. % oxygen and less than 50 ppm methane and having a content of organic sulfur compounds of 3300 mg/Nm$^3$ and a content of inorganic sulfur compounds of 200 mg/Nm$^3$, is fed continuously in amounts of 8400 Nm$^3$/h to a steam heat exchanger of the conversion stage. A portion of the gas stream, having a temperature of 50° C., comes from a wet dust-removing operation and is fed to a heat exchanger by way of a precompression stage and a countercurrent heat exchanger. Another portion of the gas stream, having a temperature of about 200° C., comes from a dry dust-removing operation for the crude CO gas and is fed directly to the heat exchanger. The crude CO gas is there heated to about 300° C. and fed to the towers of the conversion stage, which are filled with aluminum oxide contact (BASF D 10-10). Before entering the conversion towers, an amount of 100 kg/h of steam is added continuously to the CO gas. The CO gas is at a pressure of 2.8 bar in this stage. The CO gas leaving the conversion stage is cooled over countercurrent heat exchangers, in which a portion of the heat of the emergent gas is given up to the gas entering the conversion stage, to about 30° C. over water heat exchangers. Continuous analytical monitoring of the emergent CO gas by so-called "on-line gas chromatography" gives a value of 50 mg/Nm$^3$ for the content of organic sulfur compounds and a value of 3450 mg/Nm$^3$ for the content of inorganic sulfur compounds, which corresponds to a rate of conversion of the organic sulfur compounds of 98.5%.

An amount of oxygen of 25 Nm$^3$/h (or 4250 mg/Nm$^3$ CO) is added to the cooled CO gas so converted, and the CO gas is passed continuously to the absorption towers of the chemical absorption stage at a pressure of 2.6 bar. In those towers, absorption of sulfur compounds and conversion into elemental sulfur takes place on the iron-hydroxide-containing porous material (product: BIOGASMASSE from RAG) in the presence of oxygen and water. The CO gas passes through four absorption towers in series. The heat of reaction that forms is dissipated by intermediate water heat exchangers to such an extent that a CO gas temperature of about 30° C. is still maintained after leaving the absorption stage. The CO gas leaves the chemical absorption stage with a content of organic and inorganic sulfur compounds of in each case 50 mg/Nm$^3$. This corresponds to a rate of absorption of inorganic sulfur compounds of 98.6%.

An amount of 1.7 Nm$^3$/h (or 154 mg/Nm$^3$ CO gas) of ammonia is added to the CO gas so desulfurized, and the CO gas is fed continuously at a pressure of 2.2 bar to the towers of the activated carbon adsorption stage, which are filled with granular activated carbon (VFT, type D 47-4). The CO gas passes through four adsorption towers in series. In those towers, the residual sulfur compounds from the CO gas are retained in the presence of not more than 0.15 vol. % oxygen and at a temperature of 30° C. and a pressure of 2.0 bar. The CO gas leaves the activated carbon adsorption stage with a content of organic and inorganic sulfur compounds of in each case less than 2 mg/Nm$^3$. This corresponds to a rate of adsorption of inorganic and organic sulfur compounds of in each case more than 96%.

The CO gas so purified is brought to a pressure of 3.5 bar in a final compression step, and water is removed therefrom to a residual content of less than 10 ppm in a subsequent conventional drying stage in accordance with the known art by preliminary condensation in a brine heat exchanger at a temperature of 3° C. and by subsequent drying in towers filled with silica gel. The pure CO gas leaving this desulfurization installation contains in each case less than 2 mg/Nm$^3$ of organic and inorganic sulfur compounds, less than 1.5 vol. % hydrogen, less than 0.15 vol. % oxygen, less than 50 ppm methane and less than 10 ppm water.

Example 2

The crude CO gas production source, the apparatuses used and the physical conditions of pressure and temperature are identical with those described in Example 1. The sulfur content of the CO gas is substantially increased compared with Example 1, the gas throughput is reduced.

In the same manner as described in Example 1, a CO gas containing less than 1.5 vol. % hydrogen, less than 0.15 vol. % oxygen and less than 50 ppm methane and having a content of organic sulfur compounds of 5650 mg/Nm$^3$ and a content of inorganic sulfur compounds of 350 mg/Nm$^3$ is fed continuously in amounts of 7000 Nm$^3$/h to the heat exchanger of the conversion stage. Before entering the conversion towers, an amount of 200 kg/h of steam is added continuously to the CO gas. The CO gas leaving the conversion stage has, according to continuous analytical monitoring, a content of organic sulfur compounds of 100 mg/Nm$^3$ and a content of inorganic sulfur compounds of 5900 mg/Nm$^3$, which corresponds to a rate of conversion of the organic sulfur compounds of 98.3%.

An amount of oxygen of 35 Nm$^3$/h (or 7140 mg/Nm$^3$ CO) is added to the cooled CO gas so converted, and the CO gas is passed continuously to the absorption towers of the chemical absorption stage at a pressure of 2.6 bar. The CO gas passes through four absorption towers in series. When the installation is operating in the optimum manner (see Example 1), the CO gas leaves the chemical absorption stage with a content of organic and inorganic sulfur compounds of in each case 100 mg/Nm$^3$. This corresponds to a rate of absorption of inorganic sulfur compounds of 98.3%.

An amount of 2.8 Nm$^3$/h (or 308 mg/Nm$^3$ CO) of ammonia is added to the CO gas so desulfurized, and the CO gas is fed continuously at a pressure of 2.2 bar to the towers of the activated carbon adsorption stage, which are filled with granular activated carbon (VFT, type D 47-4). The CO gas passes through four adsorption towers in series. The CO gas leaves the activated carbon adsorption stage with a content of organic and inorganic sulfur compounds of in each case less than 5 mg/Nm$^3$. This corresponds to a rate of adsorption of inorganic and organic sulfur compounds of in each case more than 95%.

In the case of this procedure, the pure CO gas leaving the desulfurization installation contains, after additional drying as described in Example 1, in each case less than 5 mg/Nm$^3$ of organic and inorganic sulfur compounds, less than 1.5 vol. % hydrogen, less than 0.15 vol. % oxygen, less than 50 ppm methane and less than 10 ppm water.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a CO gas that is low in sulfur, comprising:

a) feeding continuously a CO gas containing sulfur compounds that are gaseous under the process conditions to a conversion stage at temperatures of more than 280° C. and with a steam content of at least about 2.5 wt. % (based on CO gas), such that organic sulfur compounds contained in the CO gas are converted on an aluminum oxide contact to hydrogen sulfide and carbon dioxide, b) feeding continuously the CO gas containing the sulfur compounds so converted to a chemical absorption stage, wherein the hydrogen sulfide contained in the CO gas is converted on an iron-hydroxide-containing, porous material, in the presence of oxygen and water, into iron sulfide and elemental sulfur and is absorbed, c) feeding continuously the CO gas so desulfurised to an activated carbon adsorption stage for the removal of traces of hydrogen sulfide and optionally other sulfur compounds, such that some of the sulfur compounds still contained in the CO gas is converted in the presence of ammonia and traces of oxygen into water-soluble ammonium compounds.

2. The process according to claim 1, wherein the aluminum oxide contact has a specific surface area of more than about 200 m$^2$/g and a pore volume of at least about 0.5 ml/g.

3. The process according to claim 1, wherein conversion of the organic sulfur compounds is carried out at temperatures of more than about 300° C. and with a steam content of at least about 3.0 wt. % (based on CO gas).

4. The process according to claim 1, wherein the iron-hydroxide-containing, porous material contains at least about 15 wt. % (calculated as Fe) active iron(III) oxide hydrate (based on material).

5. The process according to claim 1, wherein the temperature of the CO gas is not more than about 35° C. in the activated carbon adsorption stage c).

6. The process according to claim 1, wherein, in the activated carbon adsorption stage c), ammonia is present in the CO gas in an amount of not less than about 150 and not more than about 310 mg/Nm$^3$ and oxygen is present in an amount of not more than about 0.15 vol. %.

* * * * *